March 22, 1955 R. ADELL 2,704,688
ORNAMENTAL AND PROTECTIVE MOLDING FOR VEHICLE DOOR EDGES
Filed July 8, 1954

INVENTOR.
ROBERT ADELL
BY Gregory S. Dolgorukof
ATTORNEY.

United States Patent Office 2,704,688
Patented Mar. 22, 1955

2,704,688

ORNAMENTAL AND PROTECTIVE MOLDING FOR VEHICLE DOOR EDGES

Robert Adell, Detroit, Mich.

Application July 8, 1954, Serial No. 442,120

4 Claims. (Cl. 296—44)

This invention relates to motor vehicle bodies and more particularly to an improved ornamental and protective molding adapted to be applied to the trailing edge of the doors thereof. The present application relates in a general way to my co-pending application Serial No. 373,110, filed August 10, 1953 for Automobile Body Construction, now Patent 2,685,473.

One of the objects of the present invention is to provide an improved ornamental and protective molding for trailing edges of automobile doors, which can be easily slipped on the door edge without damaging the paint thereof and be retained thereon in a dependable manner without tendency to slip off such edge.

A still further object of the present invention is to provide an improved ornamental and protective molding of the above nature, which can be slipped on the door edge by hand but which cannot be taken off by application of a pulling force on the molding and may have to be opened by application of a tool before it can come off from the edge.

A still further object of the present invention is to provide an improved ornamental and protective molding for trailing edges of automobile doors, which can be slipped on the door edge by hand and which effects a positive connection between the door edge and itself in the removal direction.

Further objects and advantages of this invention will be apparent from the following description and appended claims, reference being had to the accompanying drawing forming a part of this specification, wherein like reference characters designate corresponding parts in the several views.

It is to be understood that the invention is not limited in its application to the details of construction and arrangement of parts illustrated in the accompanying drawing, since the invention is capable of other embodiments and of being practiced or carried out in various ways. Also it is to be understood that the phraseology and terminology employed herein is for the purpose of description and not of limitation.

In accordance with the invention, I provide an ornamental and protective molding having a cross section of a generally oval or elliptic shape with one end thereof being open. At the free ends of the cross section along the entire length of the molding there are provided curled edges of a generally N-shaped cross section. The curls are so shaped that the places of juncture between the middle and the outer bar of the N constitute door edge engaging lips exerting thereon molding-retaining pressure. The free ends of the N-shaped curls terminate short of the furthest extent of such place of juncture toward the axis of the cross section and, therefore, do not scrape the surface of the edge when the molding is applied. However, after the molding is slipped over the edge all the way, the free end of its cross section or edge slips off the bent-over flange on the inner side of the door and effects positive engagement in the direction of removal of the molding between the molding and the door edge. My improved molding can be used either with mounting or compensating clips such as disclosed in my said co-pending application, or be applied directly to the door edge.

Figure 1:
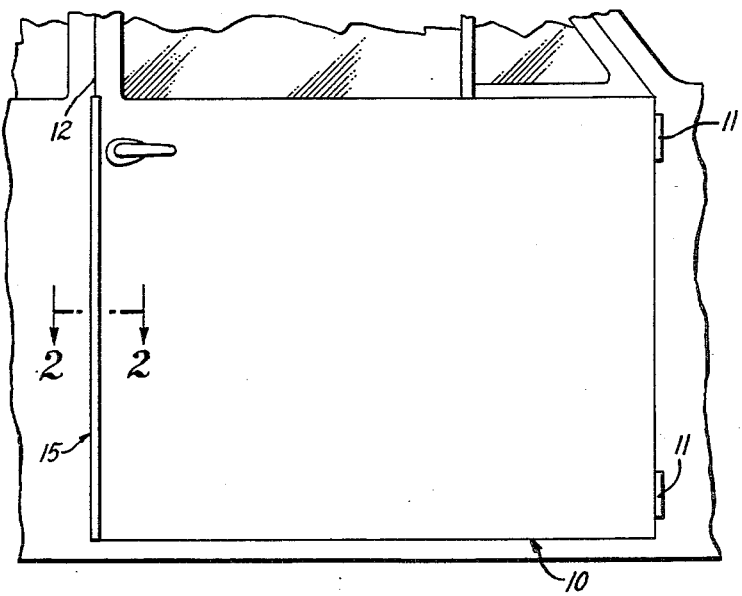
Fig. 1 is an elevational fragmentary view of an automobile body, and particularly of the door thereof, showing my improved ornamental molding applied to the lower portion of the trailing edge of said door.
Figure 4:
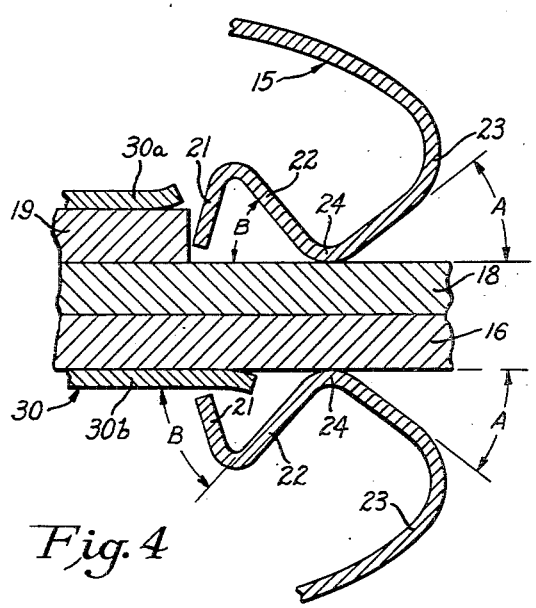
Fig. 4 is a fragmentary cross sectional view on an enlarged scale, illustrating engagement of the curls of the molding with the door edge.

In the drawing there is shown, by way of example, an ornamental and protective molding adapted to be applied to a trailing edge of an automobile door and embodying the present invention. Referring specifically to the drawings, the automobile door shown therein and generally designated by the numeral 10 may be of any suitable construction. The door is adapted to be hinged to the body construction at hinges 11 in a manner well known in the art, and it has a vertically extending trailing edge 12. The ornamental and protective molding, generally designated by the numeral 15, is applied to the lower portion of the edge 12, as shown in Figs. 1, 2 and 4.

Figure 2:
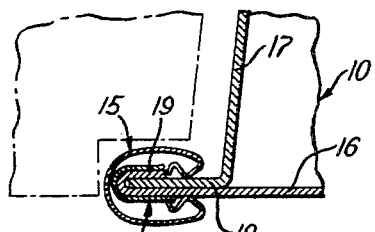
Fig. 2 is a sectional view taken in the direction of the arrows on a section plane passing through the line 2—2 of Fig. 1.
Figure 3:
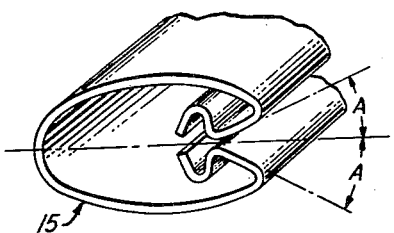
Fig. 3 is a fragmentary perspective view of a molding strip shown separately.

Referring to Fig. 2, the door 10 includes an outer or cover sheet 16 and a back sheet 17 angularly bent to provide for the thickness of the door and having a flange 18 extending parallel to and contacting the cover sheet 16, with the edge of said sheet 16 being bent over to overlie the flange 18, thus forming a somewhat narrower flange 19.

The molding 15 has a generally U-shaped or O-shaped cross section, with one end thereof being open and formed to provide curls of a generally N-shaped cross section. Each of such curls comprises generally a first bar 21, a second bar 22, and a third bar 23. The bars 23 and 22 merge into each other at a well rounded place of juncture 24 which extends toward the longitudinal axis of the cross section somewhat further than the free ends of the first bar 21. Thus, when the molding is applied to the door edge, said molding rides on said rounded portions 24 while the free ends of the portions 21 clear the painted edge surfaces and do not scrape the same. However, when the portions 24 of the inner side of the molding (upper portion in Fig. 4) passes or slides off the flange 19, the free end or edge of the portion 21 thereof becomes the supporting edge until it, in turn, rides off the flange 19. Thereupon, the portions 24 of both curls grip the edge of the door structure, ensuring secure and tight resilient retention of the molding on the door edge. The free end or edge of the first bar 21 of the outer curl (lower curl in Fig. 4) is slightly raised from the painted surface of the sheet 16 and does not affect the same. The free edge or end of the first bar 21 of the inner curl (upper curl in Fig. 4) is disposed to engage the free edge of the flange 19 as removal of the molding is attempted, thereby providing a positive connection between the molding 15 and said door edge in the removal direction. It will be noted that since the angles A are relatively small, being approximately 45 degrees, pushing the molding by hand on the door edge operates to spread or open the molding without application of any tools.

Figure 5:
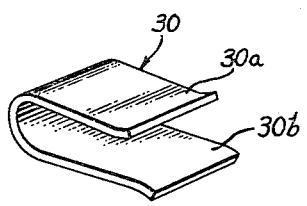
Fig. 5 is a perspective view showing one of the mounting clips separately.

My improved molding may be applied either directly to the door edge, or be applied thereto over mounting clips, such as clip 30 shown in Fig. 5. The clip 30 is generally similar in its features of construction to the clips disclosed in my said co-pending application. Clips 30 may be made from thin resilient material such as sheet steel approximately .010" thick. The outer leg 30b of the clip may be slightly longer than its inner leg 30a. When such clips are used, a plurality thereof is first slipped over the door edge. Thereupon, in applying the molding to the door edge, the portions 24 thereof ride on such clip, thereby preventing marring or scuffing the paint of the door edge. In the fully applied position of the molding, the free edge of the inner curl thereof is off the inner leg 30a of the clip 30, while similar free edge of the outer curl is disposed adjacent to the sheet 16 but without contacting the same. It should be noted that the angles B which the portions 22 make with the longitudinal cross section of the molding are relatively small and may be either substantially equal to the angle A or be slightly larger than the latter but not to the point of becoming irreversible.

Removal of my improved molding disclosed above from the door edge is exceeding simple. In order to effect such removal, a screw-driver of a similar instrument is passed under the inner curl of the molding, and the same is passed over the edge of the flange 19 (and the leg 30a of the compensating or mounting clip 30, if such clips are used). Thereupon the molding is pulled off by hand, starting from one end thereof to the opposite end.

By virtue of the above described construction the objects of the invention listed above and numerous additional advantages are attained.

I claim:

1. An ornamental and protective molding adapted to be connected to an automobile door along at least a portion of the trailing edge thereof, said molding comprising a strip of sheet metal having a generally U-shaped cross section, the edges of said strip at the ends of both legs of the U-shaped cross section of said strip being bent inwardly of the U to form N-shaped curls, with the length of the first bar of the N being shorter than the total height of the N, and the place of juncture of the second bar and the third bar of the N being well rounded and adapted to exert holding resilient pressure on the door edge structure.

2. An ornamental and protective molding adapted to be connected to an automobile door along at least a portion of the trailing edge thereof, said molding comprising a strip of sheet metal having a generally U-shaped cross section, the edges of said strip at the ends of both legs of the U-shaped cross section of said strip being bent inwardly of the U to form N-shaped curls, and a plurality of mounting clips adapted to be slipped over the door edge, said molding being adapted to be applied to said door edges over said clips and to grip said edges exerting holding pressure on the door edge structure with places of juncture of the second and third bars of the N.

3. An ornamental and protective molding adapted to be connected to an automobile door along at least a portion of the trailing edge thereof, with said edge having on its inner side a turned flange having an edge, said molding comprising a strip of sheet metal having a generally O-shaped cross section with one end of the O being open, the edges of said strip along the open end of its cross section being bent inwardly of the O to form N-shaped curls, with the place of juncture of the second and third bars of the N being rounded and extending toward the axis of the O further than the free ends of the first bar of the N in order to exert holding pressure on the door edge construction, with the free end of the first bar of the N being adapted to engage the edge of said flange.

4. An ornamental and protective molding adapted to be connected to an automobile door along at least a portion of the trailing edge thereof, with said edge having on its inner side a turned flange having an edge, said molding comprising a strip of sheet metal having a generally O-shaped cross section with one end of the O being open, the edges of said strip along the open end of its cross section being bent inwardly of the O to form N-shaped curls, with the place of juncture of the second and third bars of the N being rounded and extending toward the axis of the O further than the free ends of the first bar of the N in order to exert holding pressure on the door edge construction, with the free end of the first bar of the N being adapted to engage the edge of said flange, and a plurality of mounting clips adapted to be slipped over the door edge, said molding being adapted to be applied to said door edge over said clips.

References Cited in the file of this patent

UNITED STATES PATENTS

| | | |
|---|---|---|
| 1,961,352 | Hall | June 5, 1934 |
| 2,118,800 | Smith | May 24, 1938 |
| 2,146,090 | O'Rourke | Feb. 7, 1939 |
| 2,226,615 | Killen | Dec. 31, 1940 |